UNITED STATES PATENT OFFICE.

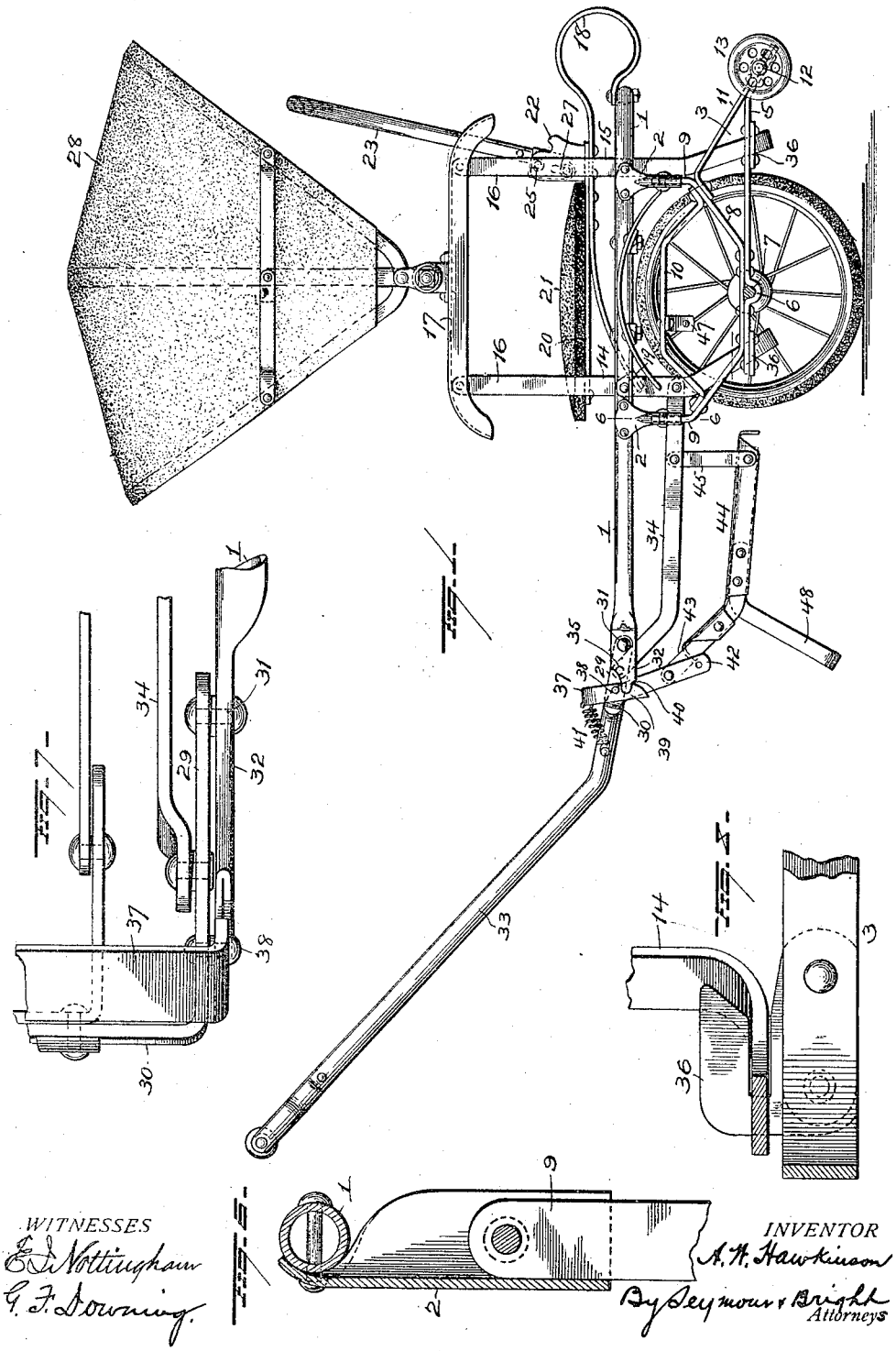

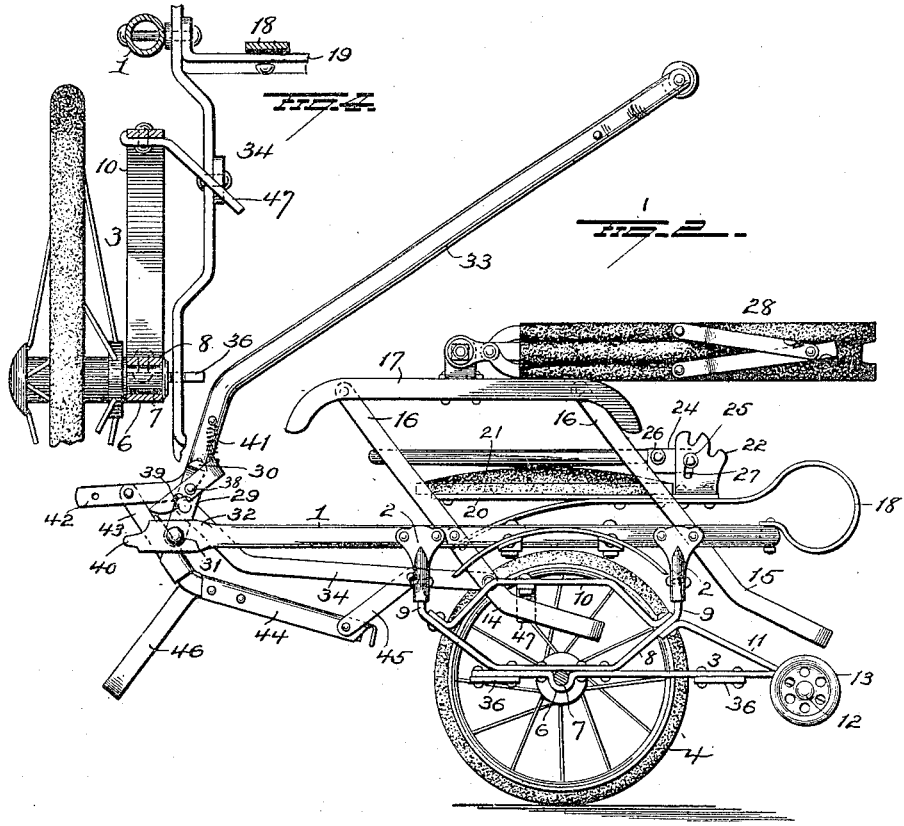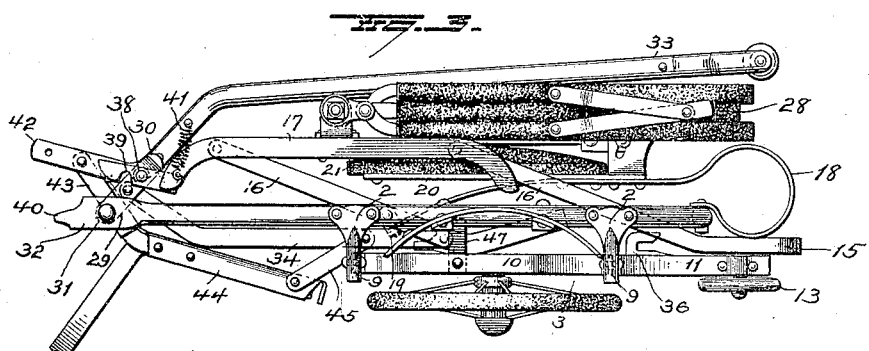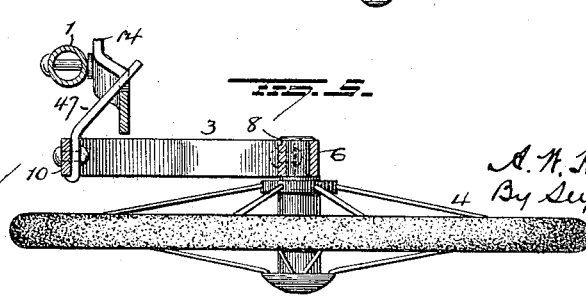

AXEL W. HAWKINSON, OF WASHINGTON, PENNSYLVANIA, ASSIGNOR TO TOPLIFF-ELY COMPANY, OF WASHINGTON, PENNSYLVANIA, A CORPORATION OF PENNSYLVANIA.

CHILD'S SULKY.

1,205,198.  Specification of Letters Patent.  Patented Nov. 21, 1916.

Application filed December 24, 1915. Serial No. 68,504.

*To all whom it may concern:*

Be it known that I, AXEL W. HAWKINSON, a citizen of the United States, and a resident of Washington, in the county of Washington and State of Pennsylvania, have invented certain new and useful Improvements in Children's Sulkies; and I do hereby declare the following to be a full, clear, and exact description of the invention, such as will enable others skilled in the art to which it appertains to make and use the same.

This invention relates to improvements in children's sulkies and more particularly to such as are capable of being folded,—one object of the invention being to provide a sulky of the type specified, which shall be simple and substantial in construction; which may be easily folded into compact form and readily unfolded and made ready for occupancy, with the use of one hand.

A further object is to provide simple and efficient means for transmitting movements to the foldable parts of the sulky; for locking the parts in normal operative positions, and for readily releasing said locking means.

With these and other objects in view, the invention consists in certain novel features of construction and combinations of parts as hereinafter set forth and pointed out in the claims.

In the accompanying drawings; Figure 1 is a side elevation of a child's sulky embodying my improvements, showing the same ready for occupancy; Fig. 2 is a side elevation showing the sulky partially folded; Fig. 3 is a side elevation showing the sulky completely folded; Figs. 4 and 5 are enlarged fragmentary views, partly in section, illustrating the devices which effect the folding of the wheel frames; Fig. 6 is an enlarged sectional view on the line 6—6 of Fig. 1, illustrating one of the connections between a pivoted wheel frame and the main frame of the sulky; Fig. 7 is an enlarged fragmentary plan view showing certain of the operating and locking devices, and Fig. 8 is an enlarged detail view showing the stop and bracing hook for one of the pivoted frames or bails.

1 represents a horizontally main frame having a general U-shape, and to the side bars of this frame, depending brackets 2 are secured for attachment of wheel frames 3, in which latter the axles of wheels 4 are mounted.

Each wheel frame comprises a lower straight bar 5 having a seat 6 for a stub axle 7 mounted in the hub of wheel 4. The stub axle is secured on its seat by the engagement of the horizontal portion of a bracket 8, the latter being formed with inclined portions terminating at their upper ends in vertical arms 9 disposed perpendicularly to the main frame 1. The depending brackets 2 may conveniently be made of sheet metal bent upon itself to embrace the arms 9 at respective ends of the bracket 8, said arms 9 being pivotally connected with the depending arms 2, and in this manner the wheeled frames are pivotally connected with the main frame so that they may be folded under the latter, as hereinafter explained. Each wheeled frame also comprises an arched brace or bracket 10 secured at its respective ends to the bracket 8, and the latter is connected, by a brace 11 with the inclined rear end of the bar 5. A stub axle 12 for a curb wheel 13 is clamped between the rear end portions of the members 5 and 11 of each wheel frame.

Two bails or frames 14 and 15 are suitably spaced apart and the parallel upright members of each bail are pivotally connected between their ends to the side bars of the main frame. The upper portions of the respective bails constitute standards 16 for arm rests 17 pivotally attached to the upper ends of said standards.

Seat springs 18 are secured at their rear ends to the rear cross bar of the main frame and at their forward ends, these seat springs are securely attached to a cross bar 19 attached between the upright members of the forward bail adjacent to the pivotal connections of said bail with the main frame. The bars 20 of a seat 21 are secured to intermediate portions of the springs 18 and upon the rear portions of these bars, upright notched brackets 22 are secured for supporting a back rest 23. Angle pieces 24 are secured to the respective side edges of the back rest and each provided with two headed pins 25, 26, the pins 25 entering elongated slots 27 in the brackets and serving to pivotally connect the back-rest therewith, and pins 26 being adapted to engage in any of the notches in the brackets and retain the back-rest at any desired adjustment. The connection of the back-rest to the seat structure as above described, also permits the former to be folded down upon the latter, as shown in Fig. 2. A suitable collapsible hood 28 is adjustably attached to the arm rests 17 and may be folded down to a horizontal position as shown in Fig. 2.

The arms 29 of a bail 30 are pivotally attached at 31 to the flattened forward portions 32 of the main frame side bars, somewhat in rear of the forward extremities of said side bars, and to said bail 30, a handle 33 is rigidly secured. Connecting bars 34 are pivotally attached at their forward ends to the arms 29 of the bail 30, at points 35 between the ends of said arms, and at their rear ends, said bars 34 are pivotally attached to the upright portions of the forward pivoted frame or bail 14. Both of the upright frames or bails 14—15 are preferably bent somewhat rearwardly near their lower ends and engage hook brackets 36 secured to the wheel frames 3, so as to provide means for rigidly connecting said wheel frames with the upright bails and brace both against lateral movement when the sulky is in use.

The depending arms of a latch bail 37 are pivotally attached, at 38, to the arms of the handle bail 30 and the arms of said latch bail are provided (below the pivotal attachments 38 of the same to the handle bail) with notches 39 to receive lugs 40 at the forward extremities of the side bars of the main frame 1. Engagement of the latch bail with the forward end of the main frame is normally maintained by the action of a spring 41, attached at one end to said latch bail and at the other end to the handle.

Brackets 42 are secured to and depend from the handle bail 30 and to these brackets, the arms 43 of a foot rest 44 are pivotally and adjustably attached, the rear portion of said foot rest being suspended from the connecting bars 34 by means of pivoted links 45. The foot rest is provided with a support 46 to rest upon the ground when the sulky is at rest.

To the arch bracket 10 of each wheel frame 3, an inwardly and downwardly cam-arm 47 is secured and so disposed as to coöperate with the forward upright bail to effect the folding of the wheel frames and wheels up under the main frame as shown in Fig. 3.

When it is desired to fold the sulky, the operator will apply foot pressure on the latch bail to release the latter from locked engagement with the main frame and then move the handle rearwardly as illustrated in Fig. 2. During this movement of the handle, motion will be imparted, through the bars 34, to the upright pivoted bail 14, and as this bail is connected with the rear bail 15, both of said bails will be turned on their pivotal connections with the main frame, so that their upper ends will move forwardly and cause their lower ends to move rearwardly. During these movements, the foot rest 44 will be caused to rise toward the main frame and the parts will take the positions shown in Fig. 2,—assuming of course that the back-rest and hood had first been folded down. The operator may now grasp the rear cross bar of the main frame and raise the wheels off the ground and permit the support at 46 to rest upon the ground. He will then continue the movement of the handle toward the body of the sulky, causing further pivotal movement of the upright bails 14—15 and the foot rest toward the main frame. As the lower portion of the forward bail 14 is thus caused to continue its rearward movement, it will engage the cam-arms 47 on the wheel frames and, by coöperation with said cam-arms, cause the wheel frames to be folded against or in close proximity to the main frame. The sulky now having been completely folded the parts will assume the positions shown in Fig. 3.

To unfold the sulky for use, it is simply necessary for the operator to grasp the handle and throw the folded sulky outwardly from him, when the same will unfold and the parts assume their normal operative positions and the latch devices will operate automatically to lock the parts. It then only remains to raise the back-rest and, if desired, adjust the hood.

Slight changes might be made in the details of construction of my invention without departing from the spirit thereof or limiting its scope, and hence I do not wish to restrict myself to the precise details herein set forth.

Having fully described my invention what I claim as new and desire to secure by Letters-Patent, is:—

1. A child's folding sulky comprising a main frame, wheel frames hinged thereto, a single wheel mounted on each wheel frame, two upright bails pivotally attached to the main frame, arm rests pivotally connecting the upper ends of one bail with the upper ends of the other bail, a handle, means connecting said handle with one of said pivoted bails, means for locking the parts, and cam-arms rigidly secured to the wheel frame in position to engage one of said bails to fold said wheel frames and the wheels carried thereby.

2. A child's folding sulky, comprising a main frame, wheel frames, each wheel frame comprising a base bar, a bracket secured thereto and pivotally connected with the main frame, a stub axle secured between said bar and bracket, wheels in which the stub axles are mounted, an arch bracket secured to the first-mentioned bracket of each wheel frame, cam-arms secured to said arch brackets, upright bails pivoted to the main frame, one of said bails being coöperable with said cam arms to fold the wheel frames, arm rests connecting said bails, a handle, and means connecting said handle with one of the pivoted bails for folding the structure.

In testimony whereof, I have signed this specification in the presence of two subscribing witnesses.

AXEL W. HAWKINSON.

Witnesses:
GEO. W. WOLFE,
L. R. STEWART.

Copies of this patent may be obtained for five cents each, by addressing the "Commissioner of Patents, Washington, D. C."